United States Patent [19]

Yoshida et al.

[11] Patent Number: 5,161,908
[45] Date of Patent: Nov. 10, 1992

[54] JOINED STRUCTURE COMPRISING MEMBERS OF DIFFERENT COEFFICIENTS OF THERMAL EXPANSION AND JOINING METHOD THEREOF

[75] Inventors: Akihiko Yoshida, Iwakura City; Yoshizumi Nakasuji, Nagoya City, both of Japan

[73] Assignee: NGK Insulators, Ltd., Japan

[21] Appl. No.: 175,393

[22] Filed: Mar. 30, 1988

[30] Foreign Application Priority Data

Apr. 6, 1987 [JP] Japan .................. 62-82973

[51] Int. Cl.$^5$ .......................... F16C 9/00; B32B 9/06; B23K 31/00
[52] U.S. Cl. ........................ 403/29; 403/30; 403/270; 428/450; 228/124; 228/125; 228/263.12
[58] Field of Search ............... 403/404, 30, 29, 28, 403/265, 270, 271; 228/122, 124, 263.12, 125; 428/81, 212, 450, 469

[56] References Cited

U.S. PATENT DOCUMENTS

| | | |
|---|---|---|
| 2,139,431 | 12/1938 | Vatter . |
| 2,226,496 | 12/1940 | Jacocks .................. 228/125 |
| 2,604,087 | 7/1952 | Gregory et al. . |
| 2,657,961 | 11/1953 | Von Lassberg .............. 29/156.5 R |
| 2,763,923 | 9/1956 | Webb .................. 228/125 |
| 3,063,144 | 11/1962 | Palmour, III . |
| 3,065,533 | 11/1962 | Dungan et al. . |
| 3,302,961 | 2/1967 | Franklin . |
| 3,311,392 | 3/1967 | Buschow .................. 403/265 X |
| 3,314,140 | 4/1967 | Albright . |
| 3,549,337 | 12/1970 | Palmer . |
| 3,893,224 | 7/1975 | Besson . |
| 4,123,199 | 10/1978 | Shimizu et al. ............... 416/241 B |
| 4,181,060 | 1/1980 | Payne .................. 228/125 X |
| 4,281,941 | 8/1981 | Rottenkolper ............... 403/404 X |
| 4,348,131 | 9/1982 | Shimanuki et al. ............ 430/271 X |
| 4,591,089 | 5/1986 | Berchem .................. 228/125 X |
| 4,648,308 | 3/1987 | Matsui et al. ............... 29/156.5 R |
| 4,702,439 | 10/1987 | Kelley et al. ............... 403/29 X |
| 4,723,862 | 2/1988 | Ito et al. .................. 403/404 X |
| 4,747,722 | 5/1988 | Kawaguchi et al. ............ 403/30 |
| 4,778,345 | 10/1988 | Ito et al. . |

FOREIGN PATENT DOCUMENTS

| | | |
|---|---|---|
| 0111989 | 6/1984 | European Pat. Off. . |
| 0232603 | 8/1987 | European Pat. Off. . |
| 3240224 | 3/1984 | Fed. Rep. of Germany . |
| 3506069 | 9/1985 | Fed. Rep. of Germany . |
| 3510940 | 10/1985 | Fed. Rep. of Germany . |
| 3511836 | 10/1986 | Fed. Rep. of Germany . |
| 3619063 | 12/1986 | Fed. Rep. of Germany . |
| 4530206 | 9/1970 | Japan . |
| 2028464 | 3/1980 | United Kingdom . |
| 2158185 | 11/1985 | United Kingdom . |

OTHER PUBLICATIONS

*Fundamentals of Machine Component Design*, Robert C. Juvinall, John Wiley & Sons Inc., 1983, pp. 98–102.
*Mechanics of Materials*, Ferdinand P. Beer et al., McGraw-Hill, Inc., 1981, pp. 80–84.

(List continued on next page.)

Primary Examiner—Randolph A. Reese
Assistant Examiner—J. Russell McBee
Attorney, Agent, or Firm—Parkhurst, Wendel & Rossi

[57] ABSTRACT

Joined structures are disclosed, which each comprise first and second members having different coefficients of thermal expansion and an intermediate member. The first and second members are joined together through the intermediate member. The intermediate member has yield stress smaller than those of the first and second members, and a tapered portion is formed at an outer peripheral surface of the intermediate member such that the tapered portion has a variable cross-sectional area orthogonal to an axis of the joined members. The area is larger at one end of the tapered portion near one of the first and second members having a smaller coefficient of thermal expansion than the area at the other end of the tapered portion near the other one of the first and second members having a larger coefficient of thermal expansion. A method of joining such first and second members having different coefficients of thermal expansion through the intermediate member is also disclosed.

11 Claims, 4 Drawing Sheets

OTHER PUBLICATIONS

*Proceedings of the Society for Experimental Stress Analysis*, "Application of Stress Concentration Factors in Design", R. E. Peterson, 1943, vol. I, No. 1, pp. 118–127.

6001 Chemical Abstracts 103 (1985) Nov., No. 18, Columbus, OH & JP 60-82267 May 1985.

6001 Chemical Abstracts vol. 94 (1981) & JP 55-121978 Sep. 1980.

6001 Chemical Abstracts vol. 94 (1981) & JP 55-122667 Sep. 1980.

Journal of the American Ceramic Society, vol. 67, No. 12, Dec. 1984, pp. C256–C257, K. Suganuma et al., "Effect of Interlayers in Ceramic–Metal Joints with Thermal Expansion Mismatches".

FIG_1a
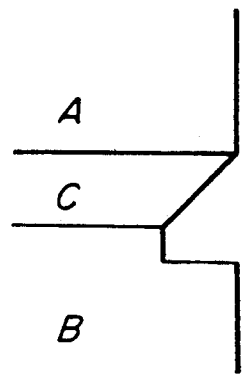
FIG_1b
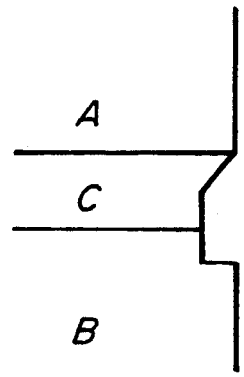
FIG_1c
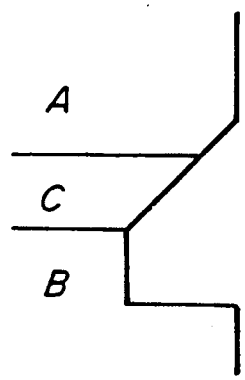
FIG_1d
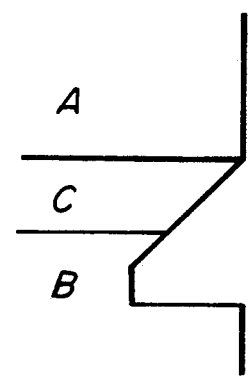
FIG_1e
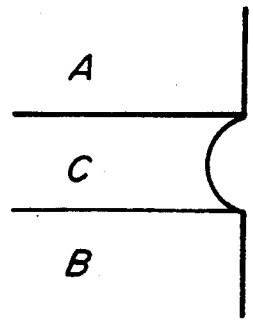

FIG_2a
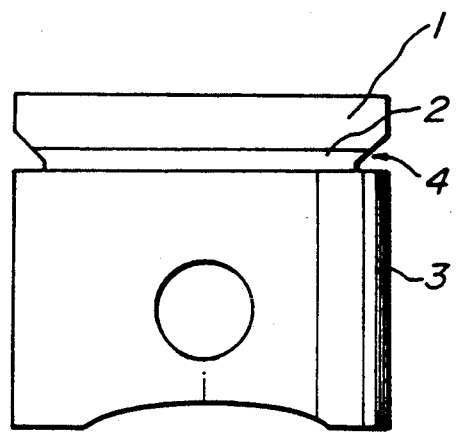
FIG_2b
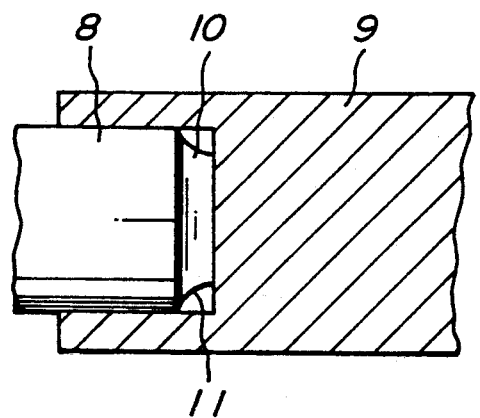

FIG_3a
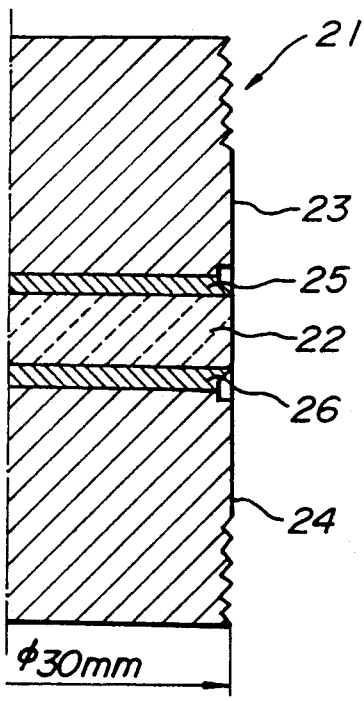
FIG_3b
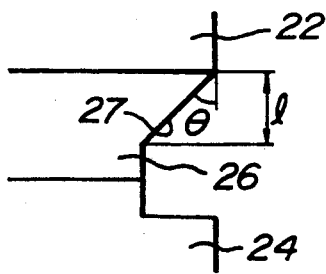

FIG_4
PRIOR ART
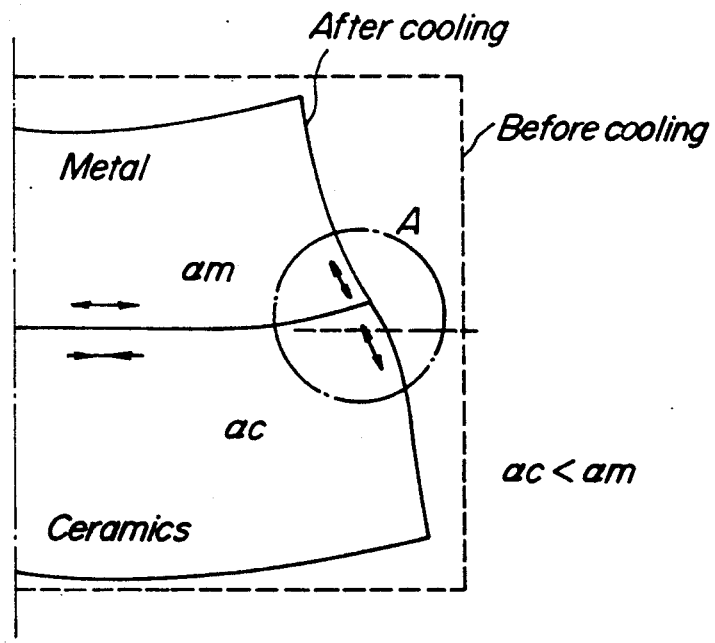

JOINED STRUCTURE COMPRISING MEMBERS OF DIFFERENT COEFFICIENTS OF THERMAL EXPANSION AND JOINING METHOD THEREOF

BACKGROUND OF THE INVENTION (1) Field of the Invention

The present invention relates to joined bodies in which members are joined together through an intermediate member. More particularly, the invention relates to joined bodies of such a structure as suitable for joining members having different coefficients of thermal expansion, for instance, a ceramic member and a metallic member.

The present invention also relates to a method of joining members having different coefficients of thermal expansion.

(2) Related Art Statement

In order to join members having different coefficients of thermal expansion through butting and bonding, a technique has been known to join these members while an intermediate member is interposed at an interface therebetween. For instance, Japanese utility model registration application Laid-open No. 59-160,533 discloses, as a joining structure between a ceramic member and a metallic member, a method of joining them with a clad made of a tungsten material or an Mo material is interposed at an interface therebetween.

However, according to the above mentioned methods, sufficient joining strength cannot be obtained because residual stress is produced at the joining interface due to difference in thermal expansion between them. Now, explanation will be explained with reference to joining between a metallic member and a ceramic member as shown in FIG. 4. Assume that the metallic member is joined to the ceramic member in a desired shape before cooling. Once the metallic member and the ceramic member having larger and smaller coefficients of thermal expansion, respectively, are cooled, the metallic member shrinks more than the ceramic member. Consequently, as shown in FIG. 4, tensile stress is exerted upon each of the metallic member and the ceramic member at an edge A of the interface. When this state proceeds, the members peel or crack at the interface edge A.

When a clad made of a tungsten or molybdenum material is used as an intermediate layer, residual stress is removed to some extent as compared with the above-mentioned case where both the members are directly joined together. However, since this intermediate layer is not provided to remove the residual stress at the joining interface, it was not possible to prevent peeling or cracking at the joining interface.

SUMMARY OF THE INVENTION

It is an object of the present invention to obviate the above-mentioned problems, and to provide a structure and a method for joining members having different coefficients of thermal expansion. The joining structure and method hardly develop peeling or cracking at an edge of an interface.

According to the present invention, there is a provision of a joining structure in which members having different coefficients of thermal expansion are joined through an intermediate member. The intermediate member has a yield stress smaller than those of the members having different coefficients of thermal expansion, and the peripheral surface of the intermediate member is provided with such a tapered portion that the tapered portion includes an edge of an interface between said intermediate member and one of said first and second members having a smaller coefficient of thermal expansion, and has a variable cross sectional area orthogonal to an axis of the joined members. The cross sectional area is larger at one end of the tapered portion near one of the first and second members having a smaller coefficient of thermal expansion than the area at the other end of the tapered portion near the other one of the first and second members having a larger coefficient of thermal expansion.

According to the present invention, there is further a provision of a method of joining first and second members having different coefficients of thermal expansion through an intermediate member, which comprises the steps of joining the first and second members having different coefficients of thermal expansion through the intermediate member, annealing the joined members, and forming such a tapered portion at the outer periphery of the intermediate member that the tapered portion includes an edge of an interface between said intermediate member and one of said first and second members having a smaller coefficient of thermal expansion. The intermediate member has a variable cross sectional area orthogonal to an axis of the joined members, the area being larger at one end of the tapered portion near one of the first and second members having a smaller coefficient of thermal expansion than the area at the other end of the tapered portion near the other one of the first and second members having a larger coefficient of thermal expansion.

In addition, according to the present invention, there is still further a provision of a method of joining first and second members having different coefficients of thermal expansion through an intermediate member, which comprises the steps of forming a desired tapered portion at the outer periphery of the intermediate member, arranging the intermediate member between the first and second members having different coefficients of thermal expansion such that the tapered portion includes an edge of an interface between said intermediate member and one of said first and second members having a smaller coefficient of thermal expansion, and has a variable cross sectional area orthogonal to an axis of the members thus arranged, the area being larger at one end of the tapered portion near one of the first and second members having a smaller coefficient of thermal expansion than the area at the other end of the tapered portion near the other one of the first and second members having a larger coefficient of thermal expansion, and joining the members together.

In the above-mentioned construction, when a yield stress of the intermediate member is made smaller than those of the first and second members having different coefficients of thermal expansion and if a tensile stress which is produced due to difference in thermal expansion or thermal shrinkage acts upon the edge of the interface, the intermediate member is plastically deformed, that is, shear-deformed. Consequently, residual stress at the interface between both the members is mitigated so that peeling and cracking at the interface edge can effectively be prevented.

When a tapered portion is formed at the outer periphery of the intermediate member such that the tapered portion includes an edge of an interface between said intermediate member and one of said first and second members having a smaller coefficient of thermal expansion, and has a variable cross sectional area orthogonal to the axis of the members, the area being larger at one end of the tapered portion near one of the first and second members having a smaller coefficient of thermal expansion than the area at the other end of the tapered portion near the other one of first and second members having a larger coefficient of thermal expansion, the direction of the tensile stress upon the intermediate member having a smaller yield stress (generally smaller hardness) is changed, so that the intermediate layer is likely to be plastically deformed or shear-deformed and that an effect of mitigating residual stress at the interface edge is promoted.

In addition, according to the joining method of the present invention, the joined members are annealed during cooling after hot press joining to remove thermal stress produced due to a difference in thermal expansion, and the tapered portion is then formed to effectively prevent peeling and cracking at the interface edge.

These and other objects, features and advantages of the invention will be appreciated upon reading of the following description of the invention when taken in conjunction with the attached drawings, with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIGS. 1(a) through (e) are schematic views illustrating examples of tapered surfaces in joined structures according to the present invention;

FIGS. 2(a) and 2(b) are schematic views illustrating examples in which actual articles embody the present invention;

FIGS. 3(a) and 3(b) are schematic views illustrating a test piece produced according to the present invention; and FIG. 4 is a view illustrating a problem encountered by a prior art joined structure.

DETAILED DESCRIPTION OF THE INVENTION

The present invention will be explained in more detail with reference to the attached drawings.

FIGS. 1(a) through (e) show various tapered shapes by way of examples. With respect to the tapered shape, any tapered shape will do in the present invention so long as a tapered portion is formed at an outer periphery of an intermediate member such that the tapered portion has a variable cross sectional area orthogonal to an axis of joined members, the area being larger at one end of the tapered portion near one of first and second members having a smaller coefficient of thermal expansion than the area at the other end of the tapered portion near the other one of the first and second members having a larger coefficient of thermal expansion. That is, a tapered portion is provided at the intermediate member C from the joining member A (smaller coefficient of thermal expansion) to the member B (larger coefficient of thermal expansion). Further, the interface of the members A and C has only to be located at the tapered portion. In a broad meaning, the tapered portion may be formed as a curved surface as shown in FIG. 1(e). The definition of the tapered portion according to the present invention may include all such tapered portions that an area of a section of an intermediate member C cut at a flat plane passing through the tapered portion in parallel with the joining interface decreases from the member A to the member B. As shown in FIGS. 1(a) through (e), the sectional edge of the tapered portion may be a straight line or a curved line. In addition, the shape of the joining face needs not be circular, but the present invention may be applicable to a joining face having a rectangular or polygonal shape. Furthermore, a tapered portion may be formed after or before the joining.

A taper angle is used throughout the specification and claims to mean an angle defined between a center axis of the joined structure and a straight sectional edge of the tapered portion or a tangent of a curved sectional edge of the tapered portion at a joining interface between A and C.

Now, the present invention will be explained in greater detail below.

FIGS. 2(a) and 2(b) are schematic views illustrating examples in which the joining method according to the present invention are applied to actual articles. FIG. 2(a) is an example in which the invention method is applied to a piston. In this example, a piston cap 1 made of partially stabilized zirconia is bonded to a piston body 3 made of nodular graphite cast iron through an intermediate layer 2 made of copper. This example uses, as the intermediate layer 2, copper having yield stress of 10 kg/mm$^2$ (hardness=H$_R$ F 40) smaller than 25 kg/mm$^2$ of graphite cast iron. A tapered portion is provided in the intermediate layer such that the diameter of the tapered portion increases toward the piston cap 1. By so constructing, the intermediate layer 2 is plastically deformed to release residual stress at edges of interfaces.

FIG. 2(b) is an example in which the invention method is applied to a rotary shaft of a turbocharger rotor or a gas turbine rotor. A rotary blade-shaft portion made of silicon nitride is joined to a metallic rotary shaft 9 through an intermediate layer 10 of copper provided with a tapered portion.

The joining method according to the present invention may be applied to any combination composed of members having different coefficients of thermal expansion, but the joining method is particularly effective to the combination of ceramic members and metallic members as mentioned above. As ceramic members employed for this purpose, use may be made of silicon nitride, silicon carbide, sialon, zirconia, mullite, alumina, beryllia, etc. As metallic members, use may be made of stainless steel, nodular graphite cast iron, nickel.chrome.molybdenum steel, chrome.molybdenum steel, aluminum.chrome.molybdenum steel, maraging steel, precipitation hardenable type super alloy, etc. Metallic members as partially or entirely hardened by precipitation hardening, nitriding or high frequency hardening are preferably used.

As intermediate members, use may be made of Cu, Al, Zn, Ti, Pb, Pt, Au, Ag, alloys thereof, etc. having smaller yield stress.

The joining may be effected by brazing, diffusion bonding, melting bonding, combinations thereof, or the like.

Next, in order to confirm the effects of a tapered portion and physical properties of an intermediate member, a test sample 21 shaped as shown in FIGS. 3(a) and 3(b) was prepared. In this test sample, a round disc 22 made of silicon nitride ($Si_3N_4$) in a diameter of 30 mm and a thickness of 10 mm was disposed between round rods 23 and 24 made of cast iron, while round thin discs 25 and 26 made of copper or a copper alloy were disposed as an intermediate member between the round disc 22 and the round rods 23 or 24, respectively. Each of the intermediate members 25 and 26 was tapered such that the outer diameter of the tapered portion increased toward the round disc 22 of silicon nitride. The test sample 21 was obtained by soldering the round rod 23, the thin disc 25, the round disc 22, the thin disc 26 and the round rod 24 with silver at 800° C. Various test samples were similarly prepared while the material of the thin disc 25 and 26, a taper angle of the tapered surface 27 provided at the thin disc, and the length, l, of the tapered portion (see FIG. 3(b)) were varied. Each of these test samples was subjected to a tensile test.

Similar tests were carried out with respect to test samples in which thin discs 25 or 26 was not tapered during joining, annealing was carried out at 400° C. for 30 minutes during the joining, and the thin discs 25 and 26 were tapered after the joining. For comparison purpose, test samples having not been annealed and/or tapered were subjected to similar tests. Results are shown in Table 1(a) and 1(b).

As is clear from the above results, as compared with the test samples having no tapered portion, the tapered test samples were not cracked during cooling, and had high tensile strength. The taper angle θ is preferably 10° or more, and more preferably 30° or more. When the taper angle is in this range, preferred tensile strength can be obtained. Sufficient strength can be attained when the length of the tapered portion is not less than 0.1 mm.

It is preferable to use, as a material of the intermediate layer, a metal having a yield stress of not more than about 20 kg/mm², for instance, 4/6 brass. It is more preferable to use copper or the like having a yield strength of about 10 kg/mm².

Furthermore, a tapered portion may be formed prior to or posterior to joining. When the tapered portion is formed after the joining, it is effective to include an annealing step, because it can mitigate reduction in the joining strength due to stress concentrations.

The present invention is not limited to the above-mentioned examples only, but various modifications, variations, and changes can be made. For instance, although joining between ceramic members and metallic members has been explained in the above-mentioned examples, the joining methods according to the present invention may be applied to any joining between members having different coefficients of thermal expansion.

As is clear from the foregoing description, according to the present invention, members having different coef-

TABLE 1

| No. | *1) Material of intermediate member | Taper angle θ | Length of tapered portion l (mm) | Annealing step | Tapering step | *2) Joined state | Tensile strength (kg · f) |
|---|---|---|---|---|---|---|---|
| Present invention | | | | | | | |
| 1 | A | 10° | 2.0 | No | Before joining | ○ | 1200 |
| 2 | A | 20° | 2.0 | No | Before joining | ○ | 1400 |
| 3 | A | 30° | 2.0 | No | Before joining | ○ | 2100 |
| 4 | A | 40° | 2.0 | No | Before joining | ○ | 2800 |
| 5 | A | 45° | 2.0 | No | Before joining | ○ | 2950 |
| 6 | A | 45° | 0.1 | No | Before joining | ○ | 2000 |
| 7 | A | 45° | 0.2 | No | Before joining | ○ | 2200 |
| 8 | A | 45° | 0.5 | No | Before joining | ○ | 2800 |
| 9 | A | 45° | 1.0 | No | Before joining | ○ | 3050 |
| 10 | A | 45° | 2.0 | Annealed | After joining | ○ | 2850 |
| 11 | B | 45° | 2.0 | No | Before joining | ○ | 2200 |
| 12 | B | 45° | 2.0 | Annealed | After joining | ○ | 2350 |
| Comparative Example | | | | | | | |
| 13 | A | 0° (no tapered portion) | — | No | — | X | — |
| 14 | A | 0° (no tapered portion) | — | No | — | ○ | 900 |
| 15 | A | 0° (no tapered portion) | — | Annealed | — | ○ | 1100 |
| 16 | A | 0° (no tapered portion) | — | Annealed | — | ○ | 950 |

*1)
A: Copper (yield stress - 10 kg/mm², hardness - $H_R$ F40)
B: 4/6 Brass (yield stress - 20 kg/mm², hardness - $H_R$ F80)
*2)
X: Peeled or cracked during cooling after joining
○: Not peeling or cracking during cooling after joining ficients of thermal expansion are joined together, while an intermediate member having a smaller yield stress than those of the former members is interposed therebetween and the intermediate member is tapered. Thereby, the intermediate member is plastically deformed to mitigate tensile stress caused due to a difference in thermal expansion between the former members. In addition, the direction of the stress at the edge of the interface is changed due to an effect of the tapered portion to facilitate the plastic deformation of the intermediate member. Such effects serve to greatly decrease residual stress at edges of the interfaces.

Furthermore, when members having different coefficients of thermal expansion are joined through an intermediate member and thermal stress is removed by annealing the joined members, thermal stress is removed from the joined members. Thus, this is coupled with reduction in residual stress which is decreased by tapering the intermediate member prior to or posterior to the joining.

What is claimed is:

1. A joined composite structure, comprising:
   a first member having a first thermal expansion coefficient;
   a second member having a second thermal expansion coefficient which is larger than said first thermal expansion coefficient;
   said first and second members being joined together via an intermediate member having a yield stress which is smaller than yield stresses of said first and second members; and
   a tapered portion formed at an outer peripheral surface of said intermediate member and including an outer peripheral edge of an interface between said intermediate member and said first member, said tapered portion having a variable cross-sectional area orthogonal to a central axis of the joined members, said area being larger at a first end thereof which is proximate said first member than said area at a second end thereof which is proximate said second member;
   wherein said tapered portion mitigates thermal stresses induced in the composite structure during joining of said first and second members via said intermediate member.

2. A joined composite structure according to claim 1, wherein an angle of said tapered portion relative to said central axis is at least 10°.

3. A joined composite structure according to claim 1, wherein the yield stress of said intermediate member is not more than 20 kg/mm².

4. A joined composite structure according to claim 2, wherein the yield stress of said intermediate member is not more than 20 kg/mm².

5. A joined composite structure according to claim 1, wherein said first member is made of a ceramic material selected from the group consisting of silicon nitride, silicon carbide, sialon, zirconia, mullite, alumina, and beryllia, and said second member is made of a metallic material selected from the group consisting of stainless steel, nodular graphite cast iron, nickel-chrome-molybdenum steel, chrome-molybdenum steel, aluminum-chrome-molybdenum steel, maraging steel and, precipitation hardenable type super alloy.

6. A joined composite structure according to claim 5, wherein said second member is made of a metallic material which is partially or entirely hardened by a step selected from the group consisting of precipitation-hardening, nitriding, and high frequency hardening.

7. A method of joining members having different coefficients of thermal expansion, comprising the steps of:
   providing a first member having a first thermal expansion coefficient;
   providing a second member having a second thermal expansion coefficient which is larger than said first thermal expansion coefficient;
   butting said first and second members together through an interposed intermediate member having a yield stress which is smaller than yield stresses of said first and second members;
   joining said first and second members together through said intermediate member; and
   forming a tapered portion at an outer peripheral surface of the intermediate member, said tapered portion including an outer peripheral edge of an interface between said intermediate member and said first member, said tapered portion having a variable cross-sectional area orthogonal to a central axis of the joined members, said area being larger at a first end thereof which is proximate said first member than said area at a second end thereof which is proximate said second member;
   wherein the step of forming said tapered portion can occur before or after the joining step such that a final article formed according to this method includes said tapered portion at said outer peripheral surface of the intermediate member, and said tapered portion mitigates thermal stresses induced in the final article during joining of said first and second member via said intermediate member.

8. A joining method according to claim 7, further comprising step of annealing said joined first and second members with said intermediate member, and then forming said tapered portion.

9. A joining method according to claim 7, wherein the tapered portion is formed before said butting and joining steps, and said butting and joining are effected after the intermediate member is interposed between the first and second members such that the tapered portion has a variable cross-sectional area orthogonal to said central axis.

10. A joining method according to claim 7, further comprising a step of annealing the joined members after the tapered portion is formed.

11. A joining method according to claim 7, wherein said first member is made of a ceramic material selected from the group consisting of silicon nitride, silicon carbide, sialon, zirconia, mullite, alumina, and beryllia, and said second member is made of a metallic material selected from the group consisting of stainless steel, nodular graphite cast iron, nickel-chrome-molybdenum steel, maraging steel and, precipitation hardenable type super alloy.

* * * * *